United States Patent
Schmitkons et al.

(10) Patent No.: US 7,077,547 B2
(45) Date of Patent: Jul. 18, 2006

(54) SHUTTERED LAMP ASSEMBLY AND METHOD OF COOLING THE LAMP ASSEMBLY

(75) Inventors: James W. Schmitkons, Lorain, OH (US); Jan L. Shanaberger, New Orleans, LA (US)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 10/901,705

(22) Filed: Jul. 29, 2004

(65) Prior Publication Data

US 2006/0022154 A1 Feb. 2, 2006

(51) Int. Cl.
*F21V 29/00* (2006.01)

(52) U.S. Cl. ............... 362/345; 362/294; 362/373; 362/283; 392/420; 392/425

(58) Field of Classification Search ............... 362/323, 362/324, 294, 373, 282, 283, 284, 345; 315/112; 392/407, 420, 422, 425

See application file for complete search history.

(56) References Cited

U.S. PATENT DOCUMENTS

| | | | | |
|---|---|---|---|---|
| 1,658,716 A | * | 2/1928 | Halvorson, Jr. | 362/329 |
| 3,860,903 A | * | 1/1975 | Van Steenhoven | 362/279 |
| 4,000,407 A | | 12/1976 | Keller et al. | 240/47 |
| 4,596,935 A | | 6/1986 | Lumpp | 250/495.1 |
| 5,094,010 A | | 3/1992 | Jacobi et al. | 34/1 |
| 5,321,595 A | | 6/1994 | Jacobi et al. | 362/373 |
| 5,722,761 A | | 3/1998 | Knight | 362/96 |
| 6,323,601 B1 | * | 11/2001 | Klein et al. | 315/248 |
| 6,457,846 B1 | | 10/2002 | Cook et al. | 362/321 |
| 6,608,967 B1 | * | 8/2003 | Arrison | 392/407 |
| 6,814,456 B1 | * | 11/2004 | Huang et al. | 362/30 |
| 6,831,419 B1 | * | 12/2004 | Schmitkons et al. | 315/312 |
| 6,880,947 B1 | * | 4/2005 | Hsieh et al. | 362/614 |
| 6,912,356 B1 | * | 6/2005 | Arrison | 392/407 |
| 2005/0088399 A1 | * | 4/2005 | Pan et al. | 345/102 |

FOREIGN PATENT DOCUMENTS

| | | |
|---|---|---|
| FR | 2334966 | 7/1977 |
| JP | 58061831 | 4/1983 |

* cited by examiner

*Primary Examiner*—Thomas M. Sember
(74) *Attorney, Agent, or Firm*—Wood, Herron & Evans, L.L.P.

(57) ABSTRACT

An ultraviolet lamp assembly includes an elongate lamp bulb, a central reflector mounted above the bulb and side reflector panels mounted on opposite sides of the central reflector panel. A first air gap is located between the first side reflector panel and the central reflector panel when the first and second side reflector panels are in the open position. A second air gap is located between the second side reflector panel and the central reflector panel when the first and second side reflector panels are in the open position. An air moving device is configured to direct cooling air downwardly through the perforations at the upper portion of the bulb and downwardly through the first and second air gaps at the lower portion of the bulb.

8 Claims, 4 Drawing Sheets

SHUTTERED LAMP ASSEMBLY AND METHOD OF COOLING THE LAMP ASSEMBLY

FIELD OF THE INVENTION

The present invention generally relates to lamp assemblies, especially those emitting ultraviolet radiation for various industrial purposes.

BACKGROUND OF THE INVENTION

Many applications in industry require the use of an ultraviolet (UV) light emitting lamp assembly. For example, ultraviolet light is often used to cure various UV curable materials, such as adhesives used to assemble products or packaging, and inks used on such products and packaging. UV lamp assemblies may be microwave powered or electrode powered and typically include a reflector which partially surrounds an elongate lamp bulb for reflecting the ultraviolet radiation emitted by the bulb onto the substrate, such as products or product packaging. The reflector commonly has a reflective surface which is elliptical or parabolic in shape and the lamp bulb is mounted along the symmetrical centerline and adjacent the apex of the reflector. The reflector increases the intensity of radiation received by the UV curable material and, therefore, the penetration of the radiation into the curable material.

Often, it is desirable to shutter the lamp on and off during a manufacturing process. It may be desirable to only irradiate a product on an assembly line for a discreet, relatively short period of time. Turning the power to the lamp on and off is one possible way to achieve the desired on/off effect, but is not practical in many situations. For example, the time period necessary to power up and power down may be too long for a high productivity environment. Also, constantly powering a lamp on and off can waste energy and shorten bulb life. As a practical alternative, mechanical shutters have been developed for selectively opening and closing a radiation emission opening of a lamp assembly while the lamp power remains on. Thus, the shutters substantially prevent the emission of radiation when closed but quickly permit full irradiation immediately upon being opened. This quickens the cycle time and therefore increases productivity.

One challenge faced with mechanical shutter systems is cooling the lamp bulb when the shutters are in the closed position. Normally, air flow is generated past the lamp bulb and freely escapes from the lamp assembly taking heat with it. When shutters are used, and they are closed, this generally restricts the air flow and allows excessive heat to build up around the lamp bulb which can harm the bulb and shorten its life. Various lamp assemblies use reflective panels to form the reflector in segments. In some lamp assemblies, two panels move together and apart in a clamshell arrangement to shutter light in a closed position and reflect light in an open position. Other lamp assemblies may add stationary reflector panels in addition to the movable panels depending on the desired effects. Cooling this type of lamp assembly has typically involved when using a so-called negative cooling system in which cooling air is drawn past the lamp bulb through a slot at the top of the reflector. In positively cooled lamps, air jets are directed at the bulb through slots in the reflector panels at various levels and in proper proportion to effectively cool upper and lower portions of the bulb. This is unlike the negatively cooled lamps which generally have a slot only at the top of the reflector.

Air cooled lamp assemblies using a multi-paneled reflector configuration require multiple long narrow panels of thin, highly polished aluminum. Without support, these thin panels can easily overheat and warp from the heat of the bulb. It is common to support the thin aluminum reflector panels with an extrusion formed to the desired profile. This works well for the outer reflector panels, but not as well for the center section. In order to cool the bulb, this center section or panel is perforated with a complicated pattern of holes. Therefore, using an extrusion to support this center panel would likewise require that the extrusion be drilled with the complicated hole pattern. This would lead to higher costs of manufacture. Moreover, thicker aluminum in which holes can be punched or otherwise formed prior to bending to the necessary reflective surface is not available in a highly polished, mirror finish.

Finally, due to the complexity of existing shutter mechanisms, the reflector panels in existing designs are difficult to replace as they require disassembly of the lamp head.

For these and other reasons, it would be desirable to provide an apparatus and method which enables more effective positive cooling of a lamp bulb, easier assembly and disassembly of the reflector panels, and less propensity for reflector movement or warpage.

SUMMARY OF THE INVENTION

The present invention generally relates to a UV lamp assembly which provides both an effective shuttering mechanism using reflector panels of the assembly itself, and an efficient cooling system and method integrated into the shuttering mechanism. The cooling system ensures that adequate cooling of the UV lamp bulb occurs in both the shuttered and unshuttered positions. In the unshuttered or open position in which a substrate is being irradiated with UV light, the lamp bulb is be contacted with a high flow of cooling air since the assembly is typically at full power. During the shuttered or closed position, the power to the lamp bulb is automatically reduced and less cooling air flow contacts the lamp bulb. The present invention provides an efficient manner of achieving proper bulb cooling in both the open and closed positions, while achieving increased bulb efficiency.

More specifically, a UV lamp assembly according to the invention comprises an elongate ultraviolet lamp bulb having upper and lower portions, a central reflector panel, and first and second side reflector panels mounted on opposite sides of the elongate lamp bulb for pivoting movement toward each other to a closed position and away from each other to an open position. The central reflector panel is mounted above the elongate lamp bulb and between the first and second side reflector panels, and includes perforations. A first air gap is located between the first side reflector panel and the central reflector panel when the first and second side reflector panels are in the open position. A second air gap is located between the second side reflector panel and the central reflector panel when the first and second side reflector panels are in the open position. An air moving device is configured to direct cooling air downwardly through the perforations at the upper portion of the bulb and downwardly through the first and second air gaps at the lower portion of the bulb.

The first and second side reflectors each have an inner reflective surface and an outer surface and are configured such that more air flow from the air moving device is directed adjacent and past the outer surface when the side reflector panels are in the closed position than when the side reflector panels are in the open position. Thus, less air flow is directed through the gaps between the central reflector panel and the side reflector panels in the closed position. The central reflector panel further comprises reflective material wrapped as a skin around a piece of support material. The reflective material and the support material each have respective perforations, which may or may not be the same size, and which may take on various configurations. The first and second air gaps preferably remain between the first and second side reflector panels and the central reflector panel when the first and second side reflector panels are in the closed position, although they may be of smaller size or otherwise modified to direct less air flow against the bulb. In this manner, cooling air continues to be directed at the lower portion of the lamp bulb, albeit at a lower rate than when the side reflector panels are in the open position.

The invention also provides a method of irradiating a substrate with an elongate ultraviolet lamp bulb having upper and lower portions mounted adjacent a central reflector panel having an inner reflective surface and adjacent first and second side reflector panels each having an inner reflective surface and an outer surface. The method generally comprises moving the first and second side reflector panels into an open position to expose the substrate to the lamp bulb. The substrate is irradiated with the lamp bulb while a first flow of cooling air is directed through the central panel at the upper portion of the lamp bulb. During this time as well, second and third flows of cooling air are respectively directed between the first side reflector panel and the central panel and between the second side reflector panel and the central panel such that the second and third flows of cooling air contact the lower portion of the lamp bulb. The first and second side reflector panels are then moved to the closed position and at least some of the cooling air is bypassed around the outer surfaces of the side reflector panels while the first and second side reflector panels are in the closed position. At the same time, the power supplied to the lamp bulb is automatically reduced to a standby level. This maintains the lamp bulb at an elevated temperature which is below its operating temperature.

The method preferably further involves maintaining respective portions of the second and third flows of cooling air while the first and second side reflector panels are in the closed position. The preferred elevated temperature of the lamp bulb in the closed position is between about 700° C. and about 800° C. While the assembly is in the closed position, the air moving device preferably maintains the same air flow rate as it does during the open position and the power supplied to the lamp bulb is preferably reduced, such as to about 60% of its full power or less.

Additional details, features and advantages will become more apparent to those of ordinary skill upon review of the following detailed description of the preferred embodiment taken in conjunction with the accompanying drawings.

DETAILED DESCRIPTION OF PREFERRED EMBODIMENT

This is a description of the preferred embodiment of the present invention, but the details discussed herein are not to be construed as limitations on the scope of the invention except to the extent of the claims appended hereto. In addition, although spatial references, such as the terms "upper" and "lower" and other similar terms are used herein, these terms are not meant to be limiting in nature but are used for the sake of more easily discussing the drawings. It will be understood that an assembly constructed according to the invention may be placed in any number of spatial orientations.

Figure 1:
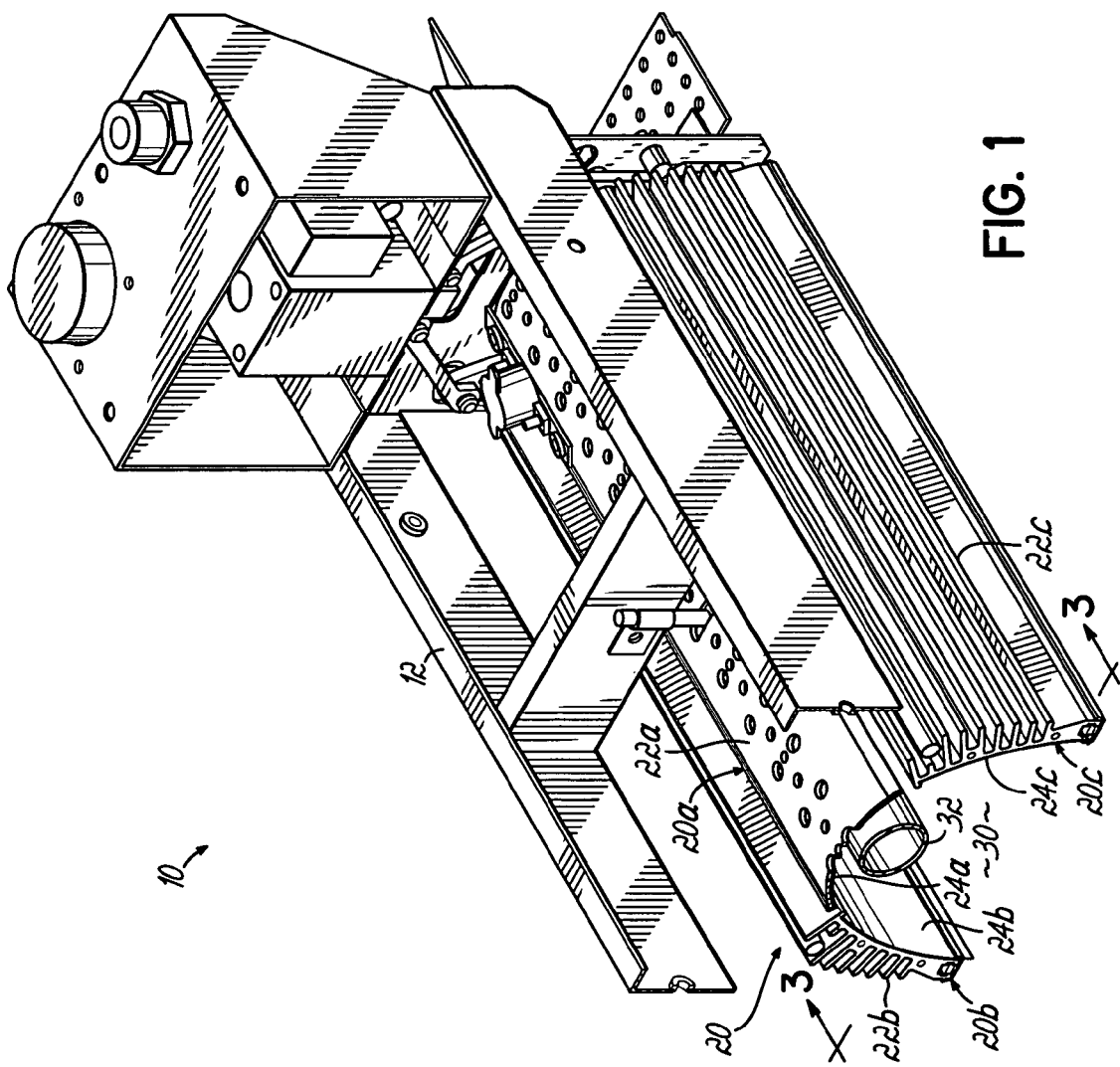
FIG. 1 is a perspective view of a lamp assembly constructed in accordance with the invention.
Figure 2:
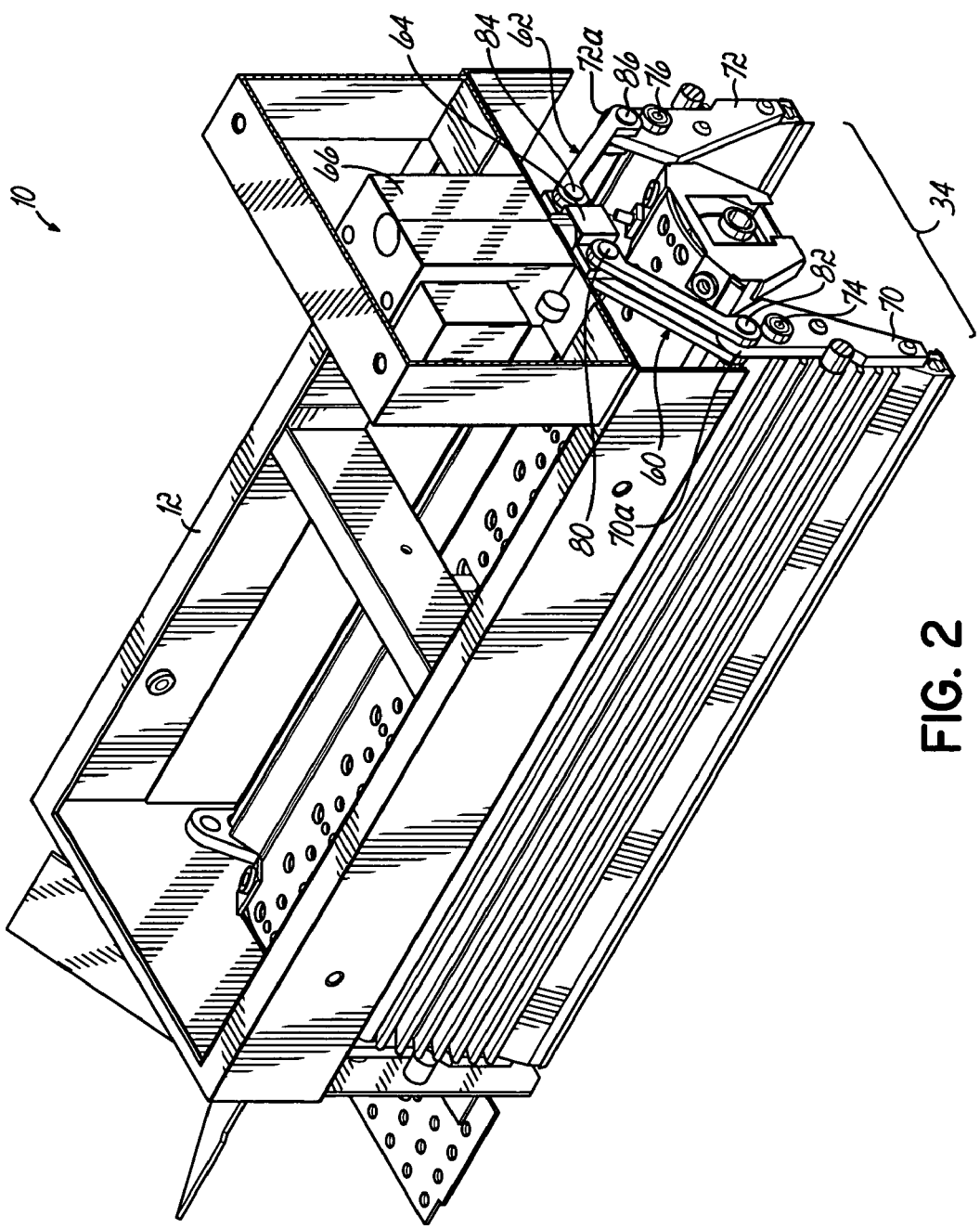
FIG. 2 is a perspective view of the lamp assembly of FIG. 1, from an opposite direction, and partially sectioned to show adjustment structure associated therewith.

FIGS. 1 and 2 respectively illustrate perspective views of a partially disassembled electrode lamp assembly 10 for emitting UV radiation. For clarity, these drawing figures do not illustrate a housing and various other conventional structure normally associated with such lamp assemblies. However, a suitable lamp assembly useful for incorporating the present invention is an industrial electrode lamp available from Nordson Corporation, Westlake, Ohio. Housing structure 12 is shown for a reflector 20 which comprises three reflector bodies 20a, 20b, 20c. Reflector body 20a is centrally located and fixed in place and a pair of reflector bodies 20b, 20c are located on opposite sides of the central reflector body 20a and are pivotal for position adjustment purposes as will be discussed in more detail below. The two pivotal reflective bodies 20b, 20c are formed as extrusions 22b, 22c with concave inner surfaces which receive respective reflector panels 24b, 24c which may, for example, be formed of highly polished aluminum or other similar reflective material, or materials coated with a reflective or dichroic material. Central reflector body 20a is formed using a rigid support member 22a of concave shape receiving a similarly shaped reflective panel or skin 24a having reflective properties similar to panels 24b, 24c. Together, the three reflective bodies 20a, 20b, 20c form an elliptical shape around a cavity 30.

Figure 3:
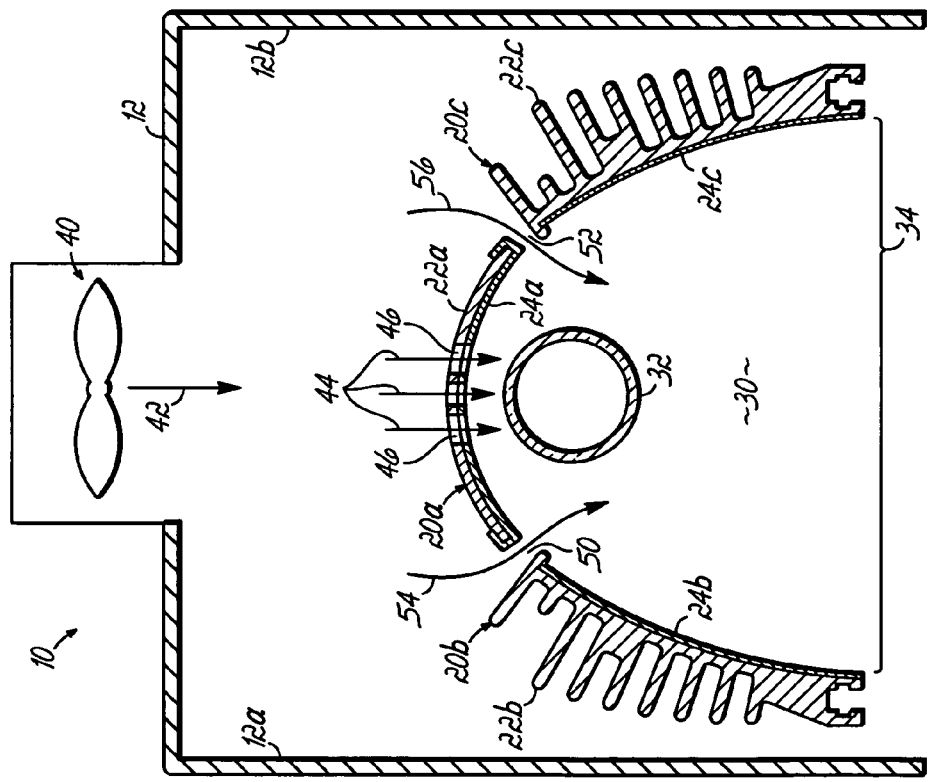
FIG. 3 is an end view taken along line 3—3 of FIG. 2, and showing an open position of the first and second reflective panels.

A lamp bulb 32 is mounted in the cavity 30 for emitting ultraviolet radiation down onto a substrate (not shown) positioned below the assembly 10. Specifically, the radiation from the lamp bulb 32 passes through an emission opening 34 (FIGS. 2 and 3). Radiation emitted from the bottom of the lamp bulb 32 is directly transmitted to the substrate while radiation emitted from the sides and the top of the lamp bulb 32 reflects off the reflector bodies 20a, 20b, 20c before reaching the substrate. The side reflective panels 24b, 24c of the pair of adjustable reflector bodies 20b, 20c are held in place between respective flanges of the extrusions 22b, 22c and clamps fixed to the extrusions at the lower ends of the extrusions by bolts, the details of such conventional structure being deleted in the drawings for clarity.

A pair of linkage assemblies 60, 62, as best shown in FIG. 2 connect between a reciprocating element 64 of an pneumatically operated linear actuator 66 (e.g., an air cylinder) and upper ends 70a, 72a of mounting flanges 70, 72 coupled with reflector bodies 20a, 20b, 20c by respective pivot connections 74, 76. Upper and lower pivot connections 80, 82, 84, 86 are formed between reciprocating element 64 of the actuator 66 and the respective flanges 70, 72 associated with the reflector bodies 20b, 20c. In this manner, reflector bodies 20b, 20c and their respective side panels 24b, 24c can be moved between the open and closed positions shown respectively in FIGS. 3 and 4 by reciprocating element 64 back and forth using actuator 66. Additional description of this linkage and actuation structure is found in U.S. patent application Ser. No. 10/699,288, assigned to the assignee of the present invention and the disclosure of which is hereby incorporated.

An air moving device 40, such as a blower, is also diagrammatically illustrated at the top of the assembly 10 coupled with the housing structure 12. In this orientation, therefore, cooling air is directed downwardly, preferably at a constant flow rate of between about 200 cfm and about 350 cfm. This air flow is represented by arrow 42 in FIGS. 3 and 4.

In the open position shown in FIG. 3 a substrate (not shown) is irradiated with light from UV lamp bulb both directly and by way of reflection off of panels 24a, 24b, 24c. In this position, cooling air flows 44 are directed through perforations 46 in central reflector body 20a and into contact with an upper portion of lamp bulb 32, and also through respective gaps 50, 52 between side panels 22b, 22c and central panel 22a as shown by arrows 54, 56 toward the lower portion of the lamp bulb 32. When the assembly 10 is being used to irradiate a substrate, it is typically operating at full power and, therefore, in this position, the air flows 44, 50, 52 provide maximum cooling to the lamp bulb 32. Air flow around the outside of side panel extrusions 22b, 22c is minimized due to the close proximity of these extrusions 22b, 22c with the inner side walls 12a, 12b of the housing structure 12. This ensures that the lamp bulb is maintained preferably between approximately 800° C. and approximately 900° C. in its operating mode.

Figure 4:
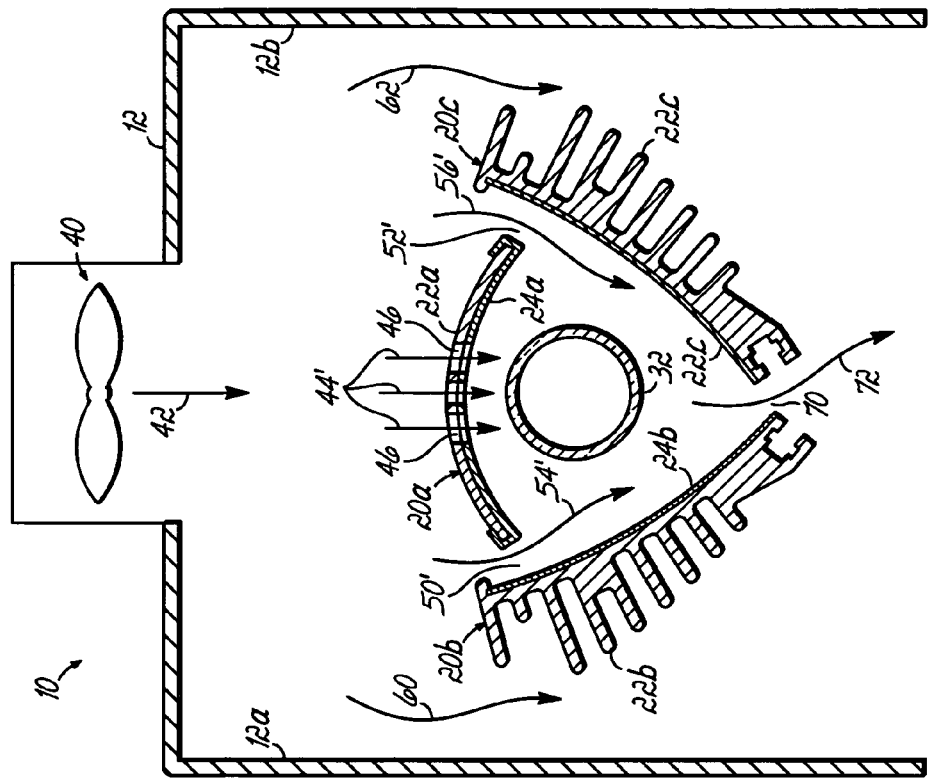
FIG. 4 is an end view similar to FIG. 3, but showing a shuttered or closed position of the first and second reflective panels.

In FIG. 4, side reflector bodies 20b, 20c have been pivoted to the closed position and the power to the lamp bulb 32 has preferably been reduced by at least 40% as described further below with regard to FIG. 5. The blower 40 continues to operate at the same constant speed as in the open position shown in FIG. 3, however, wider gaps are formed between side panel extrusions 22b, 22c and the respective adjacent inner side walls 12a, 12b of the housing structure 12. For this reason, a substantially greater amount of air flow 42 is bypassed around the outside of side reflector bodies 20b, 20c resulting in less air flow 44', 50', 52' against bulb 32. This bypass air flow is shown with arrows 60, 62 in FIG. 4. Over cooling of the lamp bulb is therefore prevented and its temperature is preferably maintained in standby at approximately 700° C. to approximately 800° C. To maintain an appropriately reduced level of cooling air flow in contact with the lamp bulb 32, air continues to flow through the perforations 46 in central reflector body 20a and through gaps 50', 52' between side panels 20b, 20c and central panel 20a although gaps 50', 52' may be smaller than gaps 50, 52 or otherwise of different configurations to achieve optimum air flow. This air flow may escape through a lower gap 70 between side panels 20b, 20c as shown by arrow 72 in FIG. 4.

Figure 5:
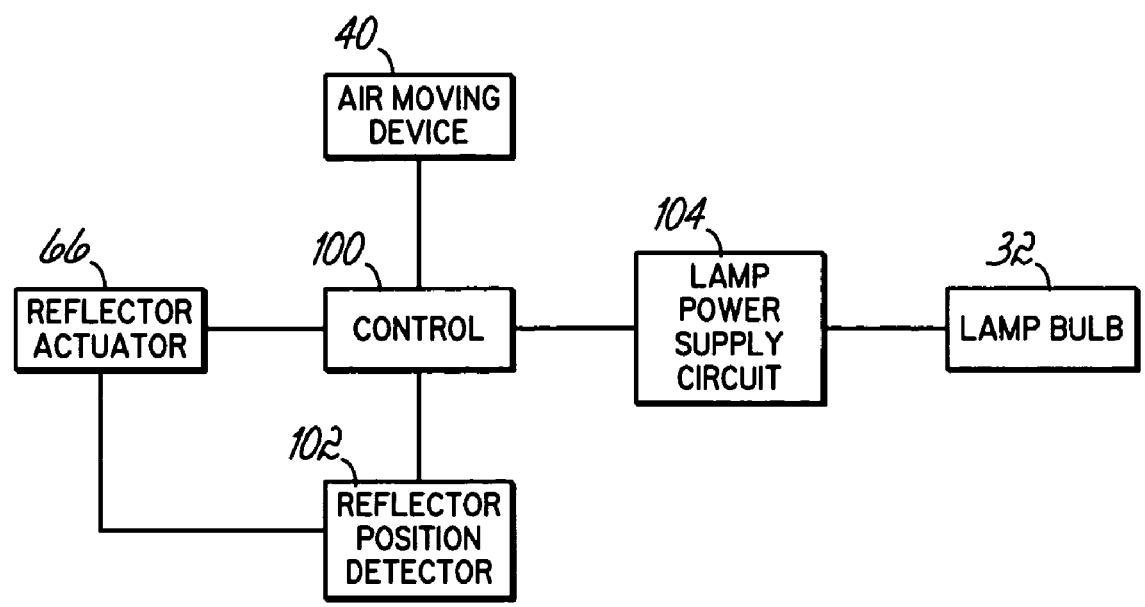
FIG. 5 is a block diagram showing the control system of the lamp assembly.

FIG. 5 illustrates a block diagram showing the control schematic for lamp assembly 10. A control 100, which may be a programmable controller or microprocessor based system, controls the various electrical components such as the previously discussed lamp bulb 32, air moving device 40 and reflector actuator 66. Control 100 operates air moving device 40 at a single speed whenever power to the system is on. Control 100 preferably operates reflector actuator 66 in accordance with a predetermined production cycle, or via sensors (not shown) which may detect the presence of a product to be irradiated by lamp bulb 32. In further accordance with the invention, the control system includes a reflector position detector 102 which senses when the reflector bodies 20b, 20c are in the open position shown in FIG. 3 or the closed position shown in FIG. 4. Control 100 is also operatively coupled to a lamp power supply circuit 104 and, upon receiving a signal from the reflector position detector 102 that the reflector bodies 20b, 20c are in the open position, the control 100 causes the lamp power supply circuit 104 to supply full operating power to lamp bulb 32. For example, this operating amount of power may be approximately 5000 watts. When the control 100 receives a signal from the reflector position detector 102 that the reflector bodies 20b, 20c are in the closed position shown in FIG. 4, the control causes the lamp power supply circuit 104 to reduce the amount of power supplied to lamp bulb 32 to a standby amount of power which, for example, may be approximately 1000 watts.

As mentioned above, in operating mode, the operating amount of power supplied to lamp bulb 32 by lamp power supply circuit 104 in combination with the cooling air flows 44, 54, 56 provided as shown in FIG. 3 allows the lamp bulb temperature to be maintained at an operating temperature between approximately 800° C. and approximately 900° C. When the lamp power is reduced during standby mode, when the reflector bodies 20b, 20c are closed as shown in FIG. 4, the combination of supplying the lamp bulb 32 with a standby amount of power equal to approximately 1000 watts and directing cooling air flows 44', 54', 56' as shown in FIG. 4 allows the lamp bulb temperature to be maintained at between approximately 700° C. and approximately 800° C. Therefore, when the reflector bodies 20b, 20c are again opened, control 100 will detect this by way of a signal provided by reflector position detector 102 and immediately cause lamp power supply circuit 104 to increase the power supplied to lamp bulb 32 to an operating amount of power. As the lamp bulb temperature is maintained relatively close to the operating temperature during the standby mode, the time and energy needed to increase the temperature into the operating range is relatively short.

While the present invention has been illustrated by a description of various preferred embodiments and while these embodiments has been described in some detail, it is not the intention of the Applicants to restrict or in any way limit the scope of the appended claims to such detail. Additional advantages and modifications will readily appear to those skilled in the art. The various features of the invention may be used alone or in numerous combinations depending on the needs and preferences of the user. This has been a description of the present invention, along with the preferred methods of practicing the present invention as currently known. However, the invention itself should only be defined by the appended claims.

What is claimed is:

1. An ultraviolet lamp assembly for irradiating a substrate, comprising:
    an elongate ultraviolet lamp bulb having upper and lower portions,
    a power supply circuit coupled to said elongate ultraviolet lamp bulb and adapted to selectively supply either an operating amount of power or a standby amount of power which is less than said operating amount of power,
    first and second side reflector panels mounted on opposite sides of said elongate lamp bulb for pivoting movement toward each other to a closed position and away from each other to an open position, a central reflector panel mounted above said elongate lamp bulb and between said first and second side reflector panels, said central reflector panel having perforations, a first air gap between said first side reflector panel and said central reflector panel when said first and second side reflector panels are in said open position, a second air gap between said second side reflector panel and said central reflector panel when said first and second side reflector panels are in said open position, an air moving device configured to direct cooling air downwardly through said perforations at said upper portion of said bulb and downwardly through said first and second air gaps at said lower portion of said bulb, and a control coupled to said power supply circuit and operative to cause said power supply circuit to supply the operating amount of power to said lamp bulb when said first and second side reflector panels are in the open position and to cause said power supply circuit to supply the standby amount of power to said lamp bulb when said first and second side reflector panels are in the closed position.

2. The lamp assembly of claim 1, wherein said first and second side reflectors each have an inner reflective surface and an outer surface and are configured such that more air flow from said air moving device is directed adjacent said outer surface when said side reflectors are in said closed position than when said side reflectors are in said open position.

3. The lamp assembly of claim 1, wherein said central reflector further comprises reflective material wrapped as a skin around a piece of support material, said reflective material and said support material each having said perforations.

4. The lamp assembly of claim 1, wherein said first and second air gaps remain respectively between said first and second side reflector panels and said central reflector panel when said first and second side reflector panels are in said closed position for directing the cooling air at the lower portion of the lamp bulb.

5. A method of irradiating a substrate with an elongate ultraviolet lamp bulb having upper and lower portions and mounted adjacent a central reflector panel having an inner reflective surface and adjacent first and second side reflector panels each having an inner reflective surface and an outer surface, comprising:

moving the first and second side reflector panels into an open position to expose the substrate to the lamp bulb, supplying power to the lamp bulb sufficient to heat the lamp bulb to an operating temperature, irradiating the substrate with the lamp bulb, directing cooling air respectively through the central panel at the upper portion of the lamp bulb between the first side reflector panel and the central panel and between the second side reflector panel and the central panel to maintain the lamp bulb at the operating temperature, moving the first and second side reflector panels to the closed position, reducing the power supplied to the lamp bulb, and directing more of the cooling air around the outer surfaces of the side reflector panels while the first and second side reflector panels are in the closed position than while the first and second side reflector panels are in the open position to maintain the lamp bulb at a standby temperature which is less than the operating temperature.

6. The method of claim 5, further comprising:

directing respective portions of the cooling air between the first side reflector panel and the central panel and between the second side reflector panel and the central panel while the first and second side reflector panels are in the closed position.

7. The method of claim 5, wherein the operating temperature is between about 800° C. and about 900° C. and the standby temperature is between about 700° C. and about 800° C.

8. The method of claim 5, wherein the step of reducing the power further comprises:

reducing the power by at least 40%.

* * * * *